United States Patent [19]
Koh et al.

[11] Patent Number: 5,648,154
[45] Date of Patent: Jul. 15, 1997

[54] INORGANIC CONSTRUCTIONAL BOARD AND METHOD OF MANUFACTURING THE SAME

[75] Inventors: Akio Koh; Hisashi Fujiwara; Kiyoshi Kurosaki; Shigezoh Masamoto; Keiji Shutoh, all of Okayama, Japan

[73] Assignee: Daiken Trade & Industry Co., Ltd., Toyama, Japan

[21] Appl. No.: 190,105

[22] PCT Filed: Jul. 31, 1992

[86] PCT No.: PCT/JP92/00970
§ 371 Date: Feb. 2, 1994
§ 102(e) Date: Feb. 2, 1994

[87] PCT Pub. No.: WO93/03238
PCT Pub. Date: Feb. 18, 1993

[30] Foreign Application Priority Data

| Aug. 2, 1991 | [JP] | Japan | 3-194182 |
| Aug. 2, 1991 | [JP] | Japan | 3-194183 |
| Aug. 2, 1991 | [JP] | Japan | 3-194184 |
| Aug. 20, 1991 | [JP] | Japan | 3-207895 |
| Sep. 5, 1991 | [JP] | Japan | 3-225755 |
| Dec. 20, 1991 | [JP] | Japan | 3-338368 |

[51] Int. Cl.⁶ ............ B32B 5/22; B32B 5/30; B32B 31/20
[52] U.S. Cl. .......... 428/313.7; 428/218; 428/313.9; 428/317.9; 428/319.1; 264/113; 264/120; 264/122; 264/333
[58] Field of Search ............ 428/313.7, 317.9, 428/319.1, 218, 313.3, 313.9; 264/122, 113, 120, 333

[56] References Cited

U.S. PATENT DOCUMENTS

| 1,883,486 | 10/1932 | Beckwith | 428/317.9 X |
| 2,008,718 | 7/1935 | Jenkins | 428/317.9 X |
| 2,692,219 | 7/1954 | Slayter et al. | 428/319.1 |
| 3,734,661 | 5/1973 | Joly-Pottuz et al. | 426/129 |
| 4,013,810 | 3/1977 | Long | 428/308 |
| 4,225,383 | 9/1980 | McReynolds | 162/156 |
| 4,297,311 | 10/1981 | Sherman et al. | 428/313.7 |
| 4,405,682 | 9/1983 | Fujita et al. | 428/319.1 |
| 4,695,494 | 9/1987 | Fowler, Jr. et al. | 428/313.7 |

FOREIGN PATENT DOCUMENTS

| A-19 23 192 | 11/1970 | Germany . |
| 3513918 | 10/1986 | Germany . |
| 47-41404 | 10/1972 | Japan . |
| 51-131513 | 11/1976 | Japan . |
| 56-41881 | 4/1981 | Japan . |
| 56-37277 | 4/1981 | Japan . |
| 56-41880 | 4/1981 | Japan . |
| 58-46619 | 10/1983 | Japan . |
| 59-83985 | 5/1984 | Japan . |
| 63-285179 | 11/1988 | Japan . |
| 64-77533 | 3/1989 | Japan . |

*Primary Examiner*—Marion E. McCamish
*Assistant Examiner*—Blaine R. Copenheaver
*Attorney, Agent, or Firm*—Wenderoth, Lind & Ponack

[57] ABSTRACT

An inorganic constructional board for use as wall backing material or the like comprises a middle layer portion (1a) formed mainly of inorganic foamed material with an adequate quantity of fibrous material and binder added thereto, and outer layer portions (1b) placed on both surfaces of the middle layer portion (1a), the outer layer portion being formed mainly of mineral fiber material and inorganic powder material with binder added thereto. The middle layer portion (1a) has a specific gravity of less than 0.4, and the outer layer portions (1b) have a specific gravity of more than 0.7. Therefore, the board is more lightweight than a plaster board and has performance characteristics equivalent to or better than those of the plaster board. The inorganic constructional board (1) is manufactured by forming a wet inorganic mat which constitutes a lower layer portion (1b) of the above mentioned composition, forming a middle layer portion (1a) of the above mentioned composition on the lower layer portion (1b) according to a dry process or wet process, stacking on the middle layer portion (1a) a wet inorganic mat which constitutes an upper layer portion (1b) of the above mentioned composition, then pressing the stacked structure to form an integral laminate and heating to dry the same.

17 Claims, 4 Drawing Sheets

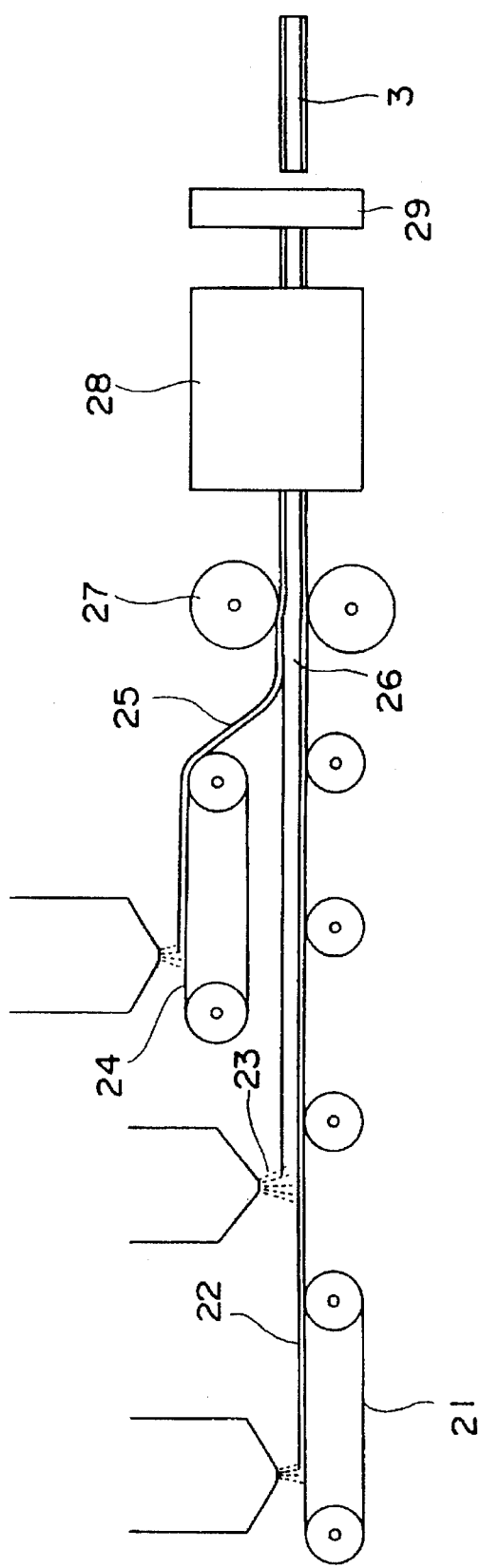

INORGANIC CONSTRUCTIONAL BOARD AND METHOD OF MANUFACTURING THE SAME

TECHNICAL FIELD

The present invention relates to an inorganic constructional board for use as wall backing material or the like, and a method of manufacturing the same.

BACKGROUND ART

Generally, an inorganic constructional board used as wall backing material or the like are required to have various performance characteristics including nail-holding strength, bending strength and impact strength of more than definite values, fire resistance, water and humidity resistance, severability and the like. Therefore, a plaster board has been conventionally used for the inorganic construction board. However, the plaster board has a specific gravity of more than 0.74 and is required to have a certain degree of thickness in order to provide a desired bending strength. This will necessitate the use of a large-size plaster board, which involves excessive weight that is inconvenient from the standpoints of transport and work execution.

Further, Both surfaces of the plaster board are made of paper, which result in the following disadvantages. Once the plaster board has absorbed water, the strength is noticeably reduced. Moreover, when the paper of both surfaces of the plaster board has been separated, the strength, water resistance and the like are extremely deteriorated.

Therefore, such plaster board cannot be used in a highly humid underground location, kitchen having a source of vapor generation or the like. For this reason, instead of the plaster board, a calcium silicate board which has superior water and humidity resistance is used in such locations.

However, the calcium silicate board has a large specific gravity (0.9 or more), which involves great weight per piece and inconvenience from the standpoints of transport and work execution.

Although the calcium silicate board is used as sheathing material, for example, eaves ceiling by virtue of their excellent resistance to water and humidity, there is a problem that such board cannot be used in a very cold region because the freezing and thawing endurance of the board is of the order of about 50 cycles (which corresponds to two to three years of use).

DISCLOSURE OF THE INVENTION

(1) Inorganic Constructional Board

In view of the foregoing problems, it is a first object of the present invention to provide an inorganic constructional board which has performance characteristics equivalent to or better than any plaster board, which has lighter weight and greater resistance to water and humidity than the plaster board, and which has lighter weight and higher freezing and thawing endurance than any calcium silicate board.

Aforesaid first object is achieved by the provision of an inorganic constructional board in accordance with the invention which comprises a middle layer portion formed mainly of inorganic foamed material with an adequate quantity of fibrous material and binder added thereto, and outer layer portions placed on both surfaces of the middle layer portion, the outer layer portion being formed mainly of mineral fiber material and inorganic powder material with binder added thereto.

The inorganic foamed material which forms the middle layer portion is intended to reduce the weight, maintaining the compressive strength. Such material may be, for example, perlite, "Shirasu" foamed material, silica flour, or foamed glass material. These material may be used alone or in combination of two or more kinds.

The proportion of such inorganic foamed material in the middle layer portion is preferably 50 to 95 wt %. If the proportion is less than 50 wt %, no effective reduction in specific gravity is obtainable in spite of an improvement in the strength as a result of relative increase of the proportion of the fibrous material. If the proportion is more than 95 wt %, it is difficult to obtain a uniform layer formation incorporating the fibrous material.

The fibrous material used in forming the middle layer portion is to interconnect particles of the inorganic foamed material. For such fibrous material may be enumerated, for example, mineral fibers, such as rock wool, slag wool or the like; synthetic resin fibers including polypropylene fibers or the like; and organic fibers, such as pulp or the like. These fibers may be used alone or in combination of two or more kinds.

Such fibrous material to form the middle layer portion may be added suitably within a proportional range of 1 to 30 wt % as required. If the proportion is less than 1 wt %, particles of the inorganic foamed material cannot sufficiently be interconnected. If the proportion is more than 30 wt %, weight reduction cannot be achieved because of a relative decrease in the amount of the inorganic foamed material.

The binder used in forming the middle layer portion is to integrally bind the fibrous material and the inorganic foamed material together. For such binder material may be enumerated, for example, synthetic resin, such as polyvinyl alcohol resin or phenolic resin, or starch, which may be used alone or in combination of two or more kinds.

Generally, the larger the proportions of binder and organic fiber is, the greater the improvement in bending strength is. Therefore, from the standpoint of strength, it is effective to include organic fiber material, such as pulp, in the middle layer portion. This is effective from the standpoint of cost as well. For the strength improvement purposes, it is also desirable to use fusion-bonding fiber material that can serve as both fibrous material and binder.

However, in order to obtain an inorganic constructional board as semi-noncombustible material, it is necessary to limit the total weight of organic components in the middle layer portion to less than 15 wt %, including the binder.

In order to obtain an inorganic constructional board as noncombustible material, it is necessary to limit the total weight of organic components to less than 7 wt %. For the fibrous material, therefore, it is desirable to use a mineral fiber material.

For the mineral fiber used in forming the outer layer portions, may be enumerated, for example, rock wool, slag wool, mineral wool, and glass fiber. These may be used alone or in combination of two or more kinds.

The proportion of mineral fiber in the outer layer portions is preferably 20 to 60 wt %. If the proportion is less than 20 wt %, the resulting bending strength is so low that the surface is likely to become broken when it is subjected to screw driving. If the proportion is more than 60 wt %, the proportion of inorganic powder material is so low that it is not possible to obtain a reasonable level of hardness in both surface hardness and total hardness.

The inorganic powder material used in forming the outer layer portion is intended to improve the hardness and to enhance the screw-holding capability, maintaining the fire proofing property. For such inorganic powder material may be enumerated, for example, calcium carbonate, silica sand, microsilica, slag, aluminum hydroxide or the like.

The proportion of the inorganic powder material in the outer layer portions is preferably 40 to 70 wt %. If the proportion is less than 40 wt %, the desired surface hardness cannot be obtained. If the proportion is more than 70 wt %, there is a relative decrease in the proportion of the mineral fiber material and, therefore, the desired strength cannot be obtained.

The strength of the outer layer portions is greatest where the inorganic powder material having a particle size of 150 μ is used. The inorganic powder material may be of 40 μ to 300 μ.

The material of the binder used in forming the outer layer portions, and the proportion thereof, are same as those described with respect to the middle layer portion. Therefore, description of them is omitted.

As stated above, the larger the proportions of binder and inorganic fiber material is, the greater the improvement in bending strength and the like is. Therefore, in addition to the mineral fibers, organic fiber material, such as pulp, may be used in the outer layer portions.

However, in order to obtain an inorganic constructional material as a semi-noncombustible material, it is required that the total amount of the organic component material be less than 15 wt %. Therefore, where organic fiber material such as pulp is used in addition to mineral fiber material, care must be taken to ensure that the total quantity of organic components including binder is within the earlier mentioned proportional range.

In order to obtain an inorganic constructional board as a noncombustible material, it is necessary that the total proportion of the organic components be less than 7 wt %.

The specific gravity of the middle layer portion is preferably less than 0.4. If the specific gravity is more than 0.4, it is difficult to attain weight reduction with respect to the inorganic constructional board. At the same time, considerable high pressure is required during the process of manufacture, which will considerably hinder productivity. However, in case where preference is placed upon strength rather than weight reduction, the specific gravity of the middle layer portion may be 0.4 to 0.7.

The specific gravity of the outer layer portions is preferably more than 0.6, especially more than 0.7. The reason for this is described hereinafter. In case where each outer layer portion is formed in such a way that the proportion of inorganic powder material is held constant, for example, at 60 wt %, and that proportions of other materials are varied, there are correlations, as can be seen from FIG. 1 and 2, between the specific gravity of the outer layer portion and the surface hardness, and between the specific gravity and the bending strength, respectively, so that both the surface hardness and the bending strength will increase as the specific gravity increases. From the standpoint of practical application, in order to obtain a surface hardness and a bending strength substantially equivalent to that of the plaster board, it is required that the specific gravity of the outer layer portion is more than 0.7. Again, in order to obtain a surface hardness and a bending strength equivalent to that of the calcium silicate board respectively, it is required that the specific gravity of the outer layer portion is more than 0.8. If the specific gravity is less than 0.8, an outer layer portion of good denseness cannot be obtained, and the increased water absorption makes it impracticable to obtain the desired water resistance.

Total specific gravity should be determined according to the required application for use of the inorganic constructional board. However, if emphasis is placed upon weight reduction by reducing the total specific gravity, any sufficient strength cannot be obtained. Considering from a balance between strength and weight reduction, therefore, it is desirable to determine 0.55 to be a lower limit of total specific gravity.

In a preferred mode of the invention, the specific gravity of the middle layer portion is less than 0.4, while the specific gravity of the outer layer portions is more than 0.7. According to this mode, both surfaces of the lightweight middle layer portion are covered with hard and densely structured outer layer portions, and therefore it is possible to obtain an inorganic constructional board having hard surface enough to hold a screw, high bending strength and insignificant heat conductivity, which are desired characteristic features for the backing material. Further, the board is more lightweight than the plaster board, which permits easy handling and easy transport.

In another preferred mode of the invention, the specific gravity of the middle layer portion is less than 0.4, while the specific gravity of the outer layer portions is more than 0.8. According to this mode, the lightweight middle layer portion is covered with outer layer portions having greater hardness and greater denseness. Therefore, a lightweight inorganic constructional board which has high resistance to water and moisture, greater surface hardness enough to hold a screw, high bending strength, and freezing and thawing endurance superior to that of any calcium silicate board is obtained.

In still another preferred mode of the invention, the specific gravity of the middle layer portion is 0.4 to 0.6, while that of the outer layer portions is more than 0.7. According to this mode, the specific gravity of the middle layer portion is closer to that of the outer layer portions, so that the weight of the board is greater than that of plaster board or calcium silicate board. On the other hand, however, the board of the invention has improved shearing strength such that the board can be used as a wall backing material for a strength member.

(2) Method of Making Inorganic Constructional Board

A second object of the invention is to provide a method for advantageously manufacturing an inorganic constructional board of the above described type.

This second object can be accomplished by the provision of a method of manufacturing an inorganic constructional board in accordance with the invention which comprises the steps of: forming a wet inorganic mat which constitutes a lower layer portion, from a slurry containing as its essential components a mineral fiber material, an inorganic powder material, and a binder; forming on the lower layer portion a middle layer portion made up mainly of inorganic foamed material with as its essential components an adequate quantity of fibrous material and binder; stacking on the middle layer portion a wet inorganic mat which constitutes an upper layer portion to obtain a stacked structure, the wet inorganic mat being formed from a slurry containing as its essential components mineral fiber material, inorganic powder material and binder; pressing the stacked structure to form an integral laminate; and heating to dry the integral laminate.

In a preferred mode of the invention, the step of forming the middle layer portion is a dry process for spreading and depositing a mixture of inorganic foamed material, fibrous material, binder and the like on the lower layer portion to a uniform thickness.

In this dry mode, the mixture for forming the middle layer portion may be a mere mixture of inorganic foamed material, fibrous material, binder and the like. Alternatively, in order to prevent the mixture from flying or the like, the mixture may be moderately moistened.

According to this dry mode, since the middle layer portion which has no excessive water content receives simultaneously moisture and heat of the vapor supplied from the wet inorganic mats of the upper and lower layer portions, the binder in the middle layer portion can easily be activated. As compared with any method in which all layer portions are formed according to a wet system, therefore, the dry mode of the invention is advantageous in that considerable reduction can be achieved in the time and cost involved in the process of drying.

In this dry mode, a mixture of component materials for the middle layer portion is spread and deposited on a wet inorganic mat which is formed in a plate-like configuration. Therefore, even if the middle layer portion is in the condition that the mixture is simply deposited on the wet inorganic mat, the middle layer portion may be transportable and may be packed with a large amount of inorganic foamed material.

In another preferred mode of the invention, the step of forming a middle layer portion is a wet process for foaming a wet inorganic mat from a slurry composed of inorganic foamed material, fibrous material, binder and the like.

In this wet mode, a wet inorganic mat for a middle layer portion is stacked on a wet inorganic mat for a lower layer portion, and a wet inorganic mat for an upper layer portion is stacked on the middle layer portion, whereby a laminated structure is obtained.

Alternatively, the wet inorganic mats for upper and lower layers may be simultaneously stacked on both surfaces of the wet inorganic mat for middle layer portion.

As mentioned above, according to the wet mode, wet inorganic mats are laid one on another to form stacked layers. This permits good interlocking between individual fibers so that interlocked fibers can hold inorganic powder or inorganic particles therebetween. Therefore, even where the proportion of binder is reduced, it is possible to readily produce a non-combustible material which nevertheless has high impact strength. Further, the product thus obtained has an advantage that it is unlikely to suffer any interface peeling, because during the stages of pressing and/or drying, the binder present in the middle layer portion is activated by the heat supplied via the wet inorganic mats of the upper and lower layer portions.

The slurry from which are formed wet inorganic mats for upper, lower and middle layer portions is obtained by putting individual component materials into water, and agitating the same to allow uniform dispersion thereof. Wet inorganic mats are made from this slurry by employing a former.

For the process of forming wet inorganic mats for upper, lower and middle layer portions, conventional methods may be selectively employed. Preferably, such process is carried out by employing, for example, a Fourdrinier-type former, which permits high speed mat making, or a cylinder-type former, which permits good fiber interlocking and can produce high-strength wet inorganic mats.

The step of pressing the stacked structure to form an integral laminate is a process for forcing out interparticle air and bringing the layers of the stacked structure into close contact with each other, wherein the mineral fibers and the inorganic foamed material of the wet inorganic mats are allowed to interlock together so that the lower, middle and upper layer portions are further integrated into unity.

The drying method to be followed in the step of heating to dry the integral laminate is not particularly limited, and may be suitably selected from conventional methods.

In the step of pressing the stacked structure to foam the integral laminate, heating may be carried out to activate the binder, which is effective for the purpose of reducing the time required in the subsequent step of heating to dry the integral laminate.

Therefore, in a further preferred mode of the invention, the step of pressing the stacked structure to form integral laminate is carried out by employing a hot press.

As one example of the hot press may be a continuous belt-type hot press. Preferably, a steel-made belt portion of the continuous belt-type hot press is constantly heated to a temperature of 100° C. to 200° C. If the temperature is less than 100° C., long time is required for activation of the binder, resulting in a decrease in line speed. If the temperature is more than 200° C., the moisture on the surface of the wet inorganic mat which is in contact with the belt portion of the hot press is rapidly evaporated, so that the binder cannot sufficiently be activated.

The heating temperature at the continuous belting press need not be uniform. The temperature may be varied according to the position for pressing. For example, the heating temperature may be gradually raised as the work proceeds rearward so that any rapid temperature rise within the wet inorganic mats can be prevented.

At the continuous belt-type hot press, a loading pressure of 2 kg/cm$^2$ or more is required to restrain the spring back of individual layers, so that high thickness accuracy can be obtained. However, the loading pressure need not be constant, and may be once removed midway in the course of pressing operation, then applied again. According to such a method, in the case of producing a inorganic construction board having high thickness, it is possible to conveniently reduce the internal pressure of the inorganic mats including water to prevent them from rupturing.

It is noted that even where the wet inorganic mats are of 4 to 5 mm thickness, a heating and pressing time of 2 seconds or more is required for activation of the binder. The longer the working time, the better.

Through such heating and pressing by the continuous belt-type hot press as described above, binder activation is carried out under heating and pressing conditions. This provides high heating efficiency which, in turn, permits binder activation to be effected in a short time. Further, it is no longer necessary to expose the wet inorganic mats to saturated vapor, so that the time required for passage of the mats through a dryer can be reduced. This enables high-speed continuous production, resulting in remarkable improvement in productivity.

Moreover, the loading pressure applied during binder activation eliminates possible spring back of the wet inorganic mats, which results in higher thickness accuracy. Therefore, sanding work required for thickness equalization is reduced, which eliminates possible material loss.

BRIEF DESCRIPTION OF THE DRAWINGS

FIG. 5 is a flow diagram showing another example of the method of manufacturing the inorganic constructional board.

BEST MODE FOR CARRYING OUT THE INVENTION

Embodiments of the present invention will now be explained.

EXAMPLE 1

Figure 1:
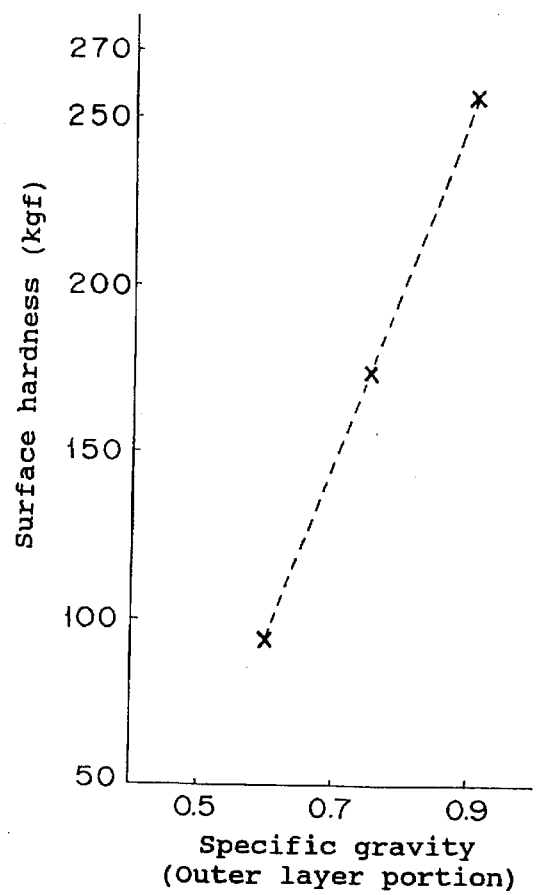
FIG. 1 is a graph showing a correlation between outer layer specific gravity and surface hardness with respect to an embodiment of an inorganic constructional board according to the present invention.
Figure 2:
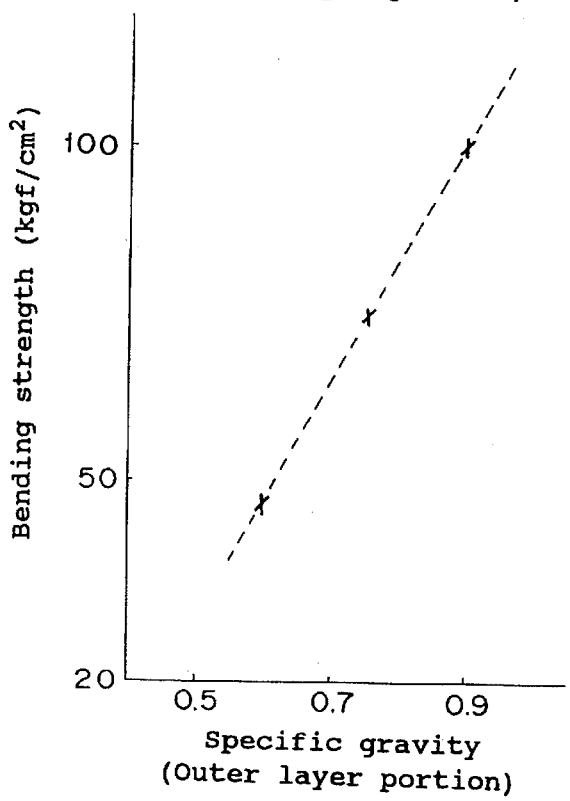
FIG. 2 is a graph showing a correlation between outer layer specific gravity and bending strength with respect to the embodiment of the inorganic constructional board of the invention.
Figure 3:
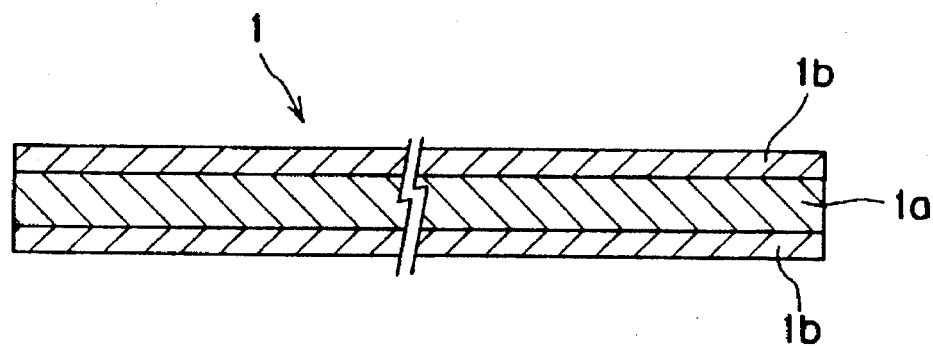
FIG. 3 is a sectional view of the embodiment of the inorganic constructional board according to the invention.

An inorganic constructional board 1 comprising a middle layer portion 1a and outer layer portions 1b placed on both surfaces of the middle layer portion was obtained as shown in FIG. 3. Respective compositions of the middle layer portion 1a and outer layer portions 1b are as follows:

| Middle layer portion | |
| --- | --- |
| Inorganic foamed material: perlite | 82 wt % |
| Fibrous material: rock wool and pulp | 10 wt % |
| Binder: phenolic resin and starch | 8 wt % |
| Outer layer portions | |
| Mineral fiber: rock wool | 27 wt % |
| Inorganic powder: calcium carbonate | 60 wt % |
| Binder: phenolic resin and starch | 8 wt % |
| Reinforcement: pulp | 5 wt % |

It is noted that the perlite was of the type having a unit volumetric mass of 0.08 (kg/l) and an average particle size of 300 μ, and the calcium carbonate was of the type having a particle size of 50 mesh through.

This inorganic constructional board 1 was manufactured in the following way.

Figure 4:
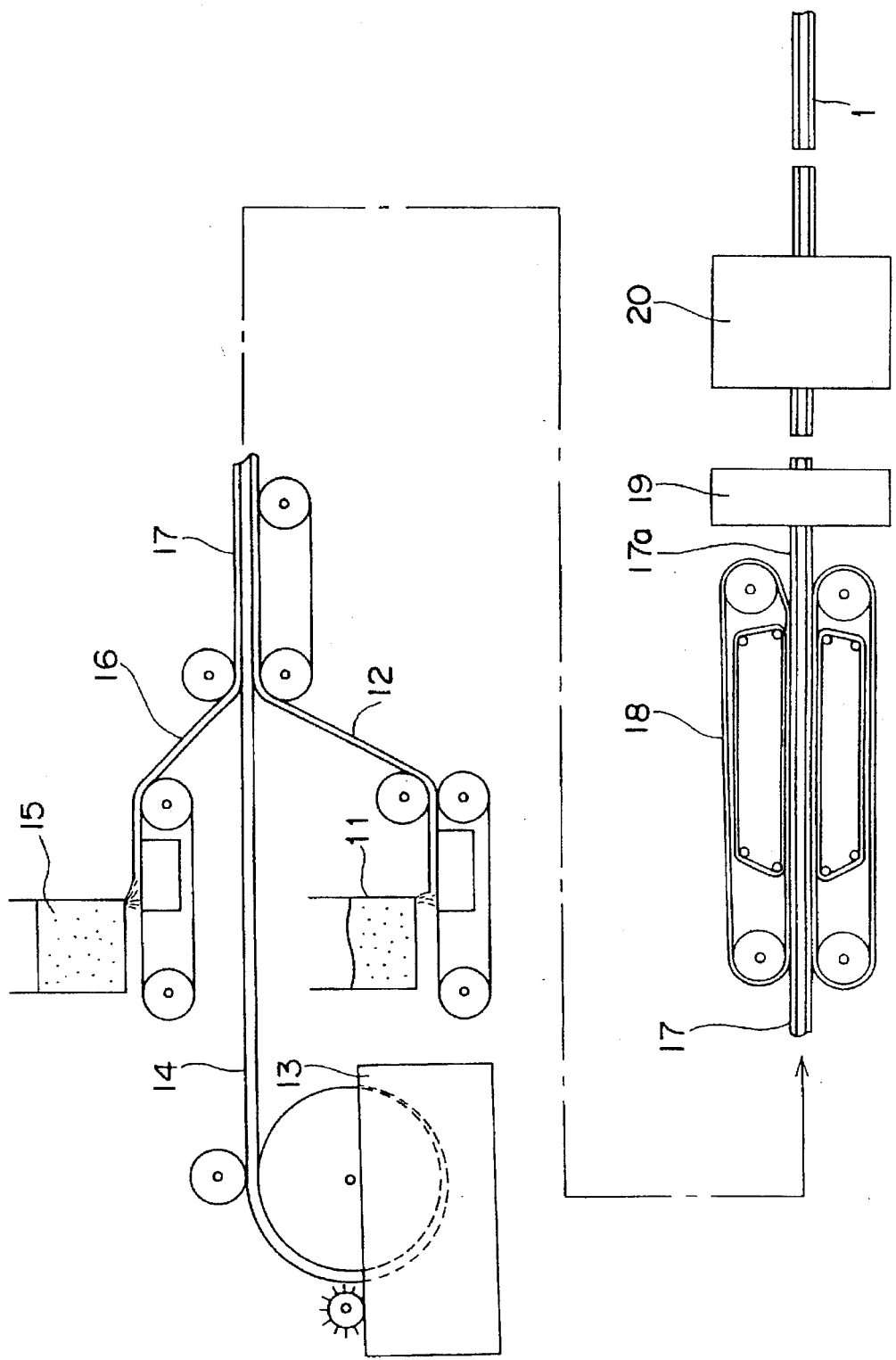
FIG. 4 is a flow diagram showing one example of the method of manufacturing the inorganic constructional board.

First, the constituent materials of the outer layer portions, namely, rock wool, calcium carbonate, phenolic resin and starch, and pulp of the above mentioned proportions were put into fresh water together with some small quantities of sizing agent and flocculating agent, and agitation was effected to give an aqueous slurry having a concentration of 2%. The slurry was conducted to Fourdrinier-type formers 11, 15, shown in FIG. 4, wherein mat forming operation was carried out. As a result, wet inorganic mats 12, 16 having a thickness of 2.0 mm and a specific gravity of 0.6, which would be used as lower and upper layer portions, were obtained.

Whilst, the constituent materials for the middle layer portion, namely, perlite, pulp, and phenolic resin and starch of the above mentioned proportions were put into fresh water together with some small quantities of sizing agent and flocculating agent, and agitation was effected to give an aqueous slurry having a concentration of 2%. The slurry was conducted to a cylinder-type former 13 shown in FIG. 4, wherein mat forming operation was carried out. As a result, a wet inorganic mat 14 having a thickness of 11 mm and a specific gravity of 0.15, which would be used as the middle layer portion, was obtained.

Nextly, on the upper surface of the wet inorganic mat 12 of 2 mm thickness, a candidate for the lower layer portion, which was obtained at the Fourdrinier-type former 11 was stacked the wet inorganic mat 14 of 11 mm thickness, a candidate for the middle layer portion, which was obtained at the cylinder-type former 13. Then, on the upper surface of the latter mentioned mat 14 was stacked the wet inorganic mat 16 of 2 mm thick, a candidate for the upper layer portion, which was obtained at the Fourdrinier-type former 15. Thus, a stacked unit 17 having a total thickness of 15 mm was obtained.

The stacked unit 17 was integrally pressed by a continuous belt-type hot press 18 (loading pressure, 5 kg/cm$^2$; heating temperature, 180° C.), whereby a laminate 17a having a thickness of 9 mm was obtained. Then, the laminate 17a was cut by a cutter 19 to a suitable length, and was dried by a dryer 20 at a heating temperature of 180° C. for 60 minutes. Thus, an inorganic constructional board sample 1 was obtained, wherein the upper and lower layer portions had a thickness of 1.5 mm and a specific gravity of 0.8 respectively; the middle layer portion had a thickness of 6 mm and a specific gravity of 0.28; and the board had a total thickness of 9 mm and a total specific gravity of 0.45.

EXAMPLE 2

In the same way as in Example 1 was obtained an inorganic constructional board which comprised a middle layer portion of the following composition, and outer layer portions of the following composition placed on opposite surfaces of the middle layer portion.

| Middle layer portion | |
| --- | --- |
| Inorganic foamed material: perlite | 80 wt % |
| Fibrous material: rock wool | 13 wt % |
| Binder: phenolic resin and starch | 7 wt % |
| Outer layer portions | |
| Mineral fiber: rock wool | 36 wt % |
| Inorganic powder: calcium carbonate | 57 wt % |
| Binder: phenolic resin and starch | 7 wt % |
| Reinforcement: none | |

As in Example 1, the perlite was of the type having a unit volumetric mass of 0.08 (kg/l) and an average particle size of 300 μ, and the calcium carbonate was of the type having a particle size of 50 mesh through. In the inorganic constructional board of this Example 2, after pressing and drying, the upper and lower layers had a thickness of 1.5 mm and a specific gravity of 0.8 respectively, and the middle layer had a thickness of 6 mm and a specific gravity of 0.28.

Comparative Example 1

A commercially available plaster board having a thickness of 9 mm and a specific gravity of 0.74 was taken as a sample.
(Comparison of Property Measurement Results)

Samples obtained in the foregoing Examples 1 and 2, and also in Comparative Example 1 were examined as to their respective physical properties. The measurement results are tabulated below.

| | Example 1 | Example 2 | Comp. Example 1 |
| --- | --- | --- | --- |
| Thickness (mm) | 9.0 | 9.0 | 9.0 |
| Specific gravity | 0.45 | 0.45 | 0.74 |
| Bending strength (kgf/cm$^2$) | 75 | 70 | 50 |
| Surface hardness (kgf) | 170 | 160 | 220 |
| Screw penetrability (kgf) | 18 | 20 | 27 |
| Heat conductivity (kcal/mh °C.) | 0.06 | 0.06 | 0.27 |
| Fire resistance | semi-noncomb acceptable | noncomb acceptable | semi-noncomb acceptable |

It is noted that the measurement results given above were obtained in accordance with the following procedures.

Bending strength: JIS 5907-1977.
Surface hardness: JIS Hardness Tester.
Screw penetrability: JIS A5910, Testing Method.
Heat conductivity: JIS A1412.
Fire resistance: JIS A1321

As is apparent from the foregoing measurement results, the specific gravity in Examples 1 and 2 is 25 to 40% smaller than that in Comparative Example 1. A 40% difference in specific gravity means that where the weight of a standard-size plaster board is about 11 kg, the weight of an inorganic constructional board of the same size according to the invention is about 6.7 kg. Therefore, in the case of plaster board, even when only about one half of available loading capacity of, for example, a truck can be utilized because of weight limitation, inorganic constructional boards of the invention can be loaded to the full available capacity of the truck. This provides for not only considerable saving in distribution cost, but also ease of manual transport to and handling at the construction site.

The fact that the bending strength in Examples 1, 2 is about 40% greater than that in Comparative Example 1 shows that the board of the former Examples are unlikely to become deformed and are more convenient for use.

The fact that the heat conductivity in Examples 1, 2 is substantially lower than that in Comparative Example 1 shows that Examples 1, 2 have good advantage in thermal insulation properties over Comparative Example 1.

Although the surface hardness and the screw penetrability in Examples 1, 2 are lower than those in Comparative Example 1, generally a surface hardness of 150 (kgf) is unlikely to allow depression or the like and involves no problem from the standpoint of practical application. An inorganic constructional board is required to have a screw penetratability on the order of more than 2.5 times the weight of the board, but this poses no problem from the standpoint of practical application, because the inorganic constructional board of the present invention per se is lightweight.

Thus, it has been found that the inorganic constructional board of the invention is about 40% lighter than the commercially available plaster board and can be used in same way as such plaster board.

EXAMPLE 3

An inorganic constructional board was obtained which comprised a middle layer portion of the following composition, and outer layer portions of the following composition placed on opposite surfaces of the middle layer portion.

| Middle layer portion | |
| --- | --- |
| Inorganic foamed material: perlite | 38 wt % |
| "Shirasu" foamed material | 30 wt % |
| Fibrous material: rock wool | 20 wt % |
| Binder: powdered phenol and starch | 7 wt % |
| Other material: aluminum hydroxide | 5 wt % |
| Outer layer portions | |
| Mineral fiber: rock wool | 40 wt % |
| Inorganic powder: calcium carbonate | 50 wt % |
| aluminum hydroxide | 5 wt % |
| Binder: powdered phenol and starch | 5 wt % |

The perlite used was of the type having a unit volumetric mass of 0.08 (kg/l) and an average particle size of 300 μ, and the calcium carbonate was of the type having a particle size of 50 mesh through. The aluminum hydroxide in the middle layer portion was added to improve fire resistance.

This inorganic constructional board was manufactured in the following way.

First, a mixture of constituent materials of the outer layer portions, namely, rock wool, calcium carbonate, aluminum hydroxide and powdered phenol and starch of the above mentioned proportions were put into fresh water together with some small quantities of sizing agent, flocculating agent and the like, and agitation was effected to give an aqueous slurry having a concentration of 2%. The slurry was conducted to Fourdrinier-type formers 21, 24, shown in FIG. 5, wherein mat forming operation was carried out. As a result, wet inorganic mats 22, 25 having a thickness of 3.5 mm, which would be used as lower and upper layer portions, were obtained.

Whilst, materials for the middle layer portion, namely, perlite, "Shirasu" foamed material, rock wool, aluminum hydroxide and powdered phenol and starch of the above mentioned proportions were mixed under spraying water of which ratio was 50 to their solid content of 100, whereby a mixture 23 for the middle layer portion was obtained.

Nextly, on the upper surface of the wet inorganic mat 22 of 3.5 mm thickness, a candidate for the lower layer portion, which was obtained at the Fourdrinier-type former 21 was uniformly spread and deposited the mixture 23 for the middle layer portion to a thickness of 9 mm, and on this mixture deposit was placed the wet inorganic mat 25 of 3.5 mm thick for the upper layer portion which was obtained at the Fourdrinier-type former 24. Thus, a stacked structure 26 having a total thickness of 16 mm was obtained.

The stacked structure 26 was pressed by a roll press 27 under a pressure of 15 kg/cm$^2$, whereby a laminate having a thickness of 6 mm was obtained. Then, the laminate was dried by a dryer 28 at a temperature of 180° C. for 90 minutes and was cut by a cutter 29 to a suitable length. Thus, an inorganic constructional board was obtained, wherein the upper and lower layer portions had a thickness of 1.5 mm and a specific gravity of 1.0 respectively; the middle layer portion had a thickness of 3 mm and a specific gravity of 0.2; and the board had a total thickness of 6 mm and a total specific gravity of 0.6. This board was taken as Sample 3.

Comparative Example 2

A commercially available calcium silicate board was taken as a sample.

(Comparison of Property Measurement Results)

Nextly, property measurement results with respect to Example 3 and Comparative Example 2 are tabulated below.

| | Example 3 | Comp. Example 2 |
| --- | --- | --- |
| Specific gravity | 0.6 | 0.9 |
| Thickness (mm) | 6 | 6 |
| Weight per piece (kg/pce) | 6 | 9 |
| Bending strength (kg/cm$^2$) | 95 | 76 |
| Screw penetrability (kgf) | 21 | 56 |
| Surface hardness (kgf) | 93 | 94 |
| Water absorption (%) | 25 | 64 |
| Dimensional change (%) | 0.07 | 0.08 |
| Freezing and thawing endurance (cycle) | 300 | 50 |

It is noted that the foregoing measurement results were obtained in accordance with the following procedures.

Water absorption: percentage of increase in weight after immersion in water for 24 hours; JIS A5403.

Dimensional change: percentage of change in dimensions after immersion in water for 24 hours; JIS A5418.

Freezing and thawing endurance: JIS A1435.

According to the above measurement results, the per-piece weight of Example 3 is two thirds of that of Comparative Example 2. This shows that while for the transport of calcium silicate boards, only one half or less of the available loading capacity of a truck can be utilized because of current weight limitation standards, inorganic constructional boards of the present invention can be loaded on the truck in a 50% greater volumetric quantity than calcium silicate boards. This provides for considerable saving in distribution cost and also ease of transport to and mounting at the construction site.

Since the Example 3 board has 25% greater bending strength than Comparative Example 2, it is much less liable to become deformed and is easier to use.

The screw penetrability of Example 3 is lower than that of Comparative Example 2. However, since it is believed that a screw penetrability of the order of 2.5 or more times the weight of the constructional board involves no problem from the standpoint of practical use and the Example 3 board is smaller in weight than Comparative Example 2, there is no particular problem.

Further, the freezing and thawing endurance of the Comparative Example 2 board is 50 cycles, which means that the board can withstand only 2 to 3 years of use, whereas that of the Example 3 board is 300 cycles, which means a capability of withstanding 10 to 20 years of use. Therefore, in a cold region, the Example 3 board of the invention can be used, without any inconvenience, for an outdoor structure, such as eaves ceiling or the like which is not directly exposed to rainwater.

From the foregoing measurement results, it has been found that the Example 3 inorganic constructional board of the invention has a low specific gravity, a light weight and an excellent freezing and thawing property in comparison with the calcium silicate board of Comparative Example 2.

EXAMPLE 4

An inorganic constructional board having a middle layer portion and outer (upper and lower) layer portions of the same compositions as Example 3 was manufactured in same way as in Example 3.

The upper and lower layer portions of this inorganic constructional board as a stacked structure, prior to the step of pressing, had a thickness of 5 mm respectively and the middle layer portion of the same had a thickness of 35 mm. For the purpose of pressing the stacked structure into an integral unit, a flat plate press was employed under a loading pressure of 20 kg/cm$^2$. After pressing and drying, the upper and lower layer portions had a thickness of 2.5 mm and a specific gravity of 0.7 mm respectively; the middle layer portion had a thickness of 7 mm and a specific gravity of 0.45; the board had a total thickness of 12 mm and a total specific gravity of 0.55.

Comparative Example 3

A commercial available plaster board having a thickness of 12 mm and a specific gravity of 0.74 was taken as a sample.

(Comparison of Property Measurement Results)

Measurement results with respect to physical properties of samples obtained in Example 4 and Comparative Example 3 are tabulated below.

|  | Example 4 | Comp. Example 3 |
|---|---|---|
| Thickness (mm) | 12 | 12 |
| Specific gravity | 0.55 | 0.74 |
| Bending strength (kgf/cm$^2$) | 200 | 60–65 |
| Shearing strength (kgf/cm$^2$) | 28 | 13.8–14.8 |

As is clear from the foregoing measurement results, the bending strength of Example 4 is 200 kgf/cm$^2$ or about three times that of Comparative Example 3 i.e. 60 –65 kgf/cm$^2$, and the shearing strength of Example 4 is 28 kgf/cm$^2$, or about two times that of Comparative Example 3 i.e. 13.8–14.8 kgf/cm$^2$.

Conventionally, when using a 12 mm-thick plaster board as a bearing wall member, the plaster board is taken as 1.0 in terms of wall magnification if it is used alone. In order to increase this magnification rate, it is necessary to use a diagonal wooden bracing having a thickness of 3 cm and a width of 9 cm (Japanese Ministry of Construction, Notification No. 1100). The inorganic constructional board according to the present invention corresponds to a material which is qualified as a wall magnification of 1.5 material itself alone, and can also be well used as a bearing wall member or a wall backing material for a strength member.

We claim:

1. An inorganic constructional board having three layer portions comprising:

a middle layer portion having first and second opposite surfaces; and first and second outer layer portions placed on the first and second opposite surfaces of the middle layer portion, respectively;

the middle layer portion comprising a mixture of an inorganic foamed material of 50–95 wt %, a fibrous material of 1–30 wt % comprising mineral fiber, and an organic binder present in an amount sufficient to integrally bind the inorganic foamed material and fibrous material;

the first and second outer layer portions comprising a mixture of a fibrous material of 20–60 wt % comprising mineral fiber, an inorganic powder material of 40–70 wt %, and an organic binder present in an amount sufficient to integrally bind the fibrous material and inorganic powder material;

wherein the mixture for the middle layer portion is spread and placed in a dry condition on the mixture for the first outer layer portion in a wet condition, while the mixture for the second outer layer portion in a wet condition is placed on the mixture for the middle layer portion in a dry condition, and then the three layer portions are pressed and heated to dry so that the outer layer portions are interlocked with the middle layer portion to obtain an integral construction board.

2. An inorganic constructional board as set forth in claim 1, wherein the middle layer portion has a specific gravity of less than 0.4 and the outer layer portions have a specific gravity of more than 0.7.

3. An inorganic constructional board as set forth in claim 1, wherein the middle layer portion has a specific gravity of less than 0.4 and the outer layer portions have a specific gravity of more than 0.8.

4. An inorganic constructional board as set forth in claim 1, wherein the middle layer portion has a specific gravity of 0.4 to 0.6 the outer layer portions have a specific gravity of more than 0.7.

5. An inorganic constructional board as set forth in claim 1, wherein the inorganic foamed material is one or more material selected from the group consisting of perlite, silica flour and foamed glass material.

6. An inorganic constructional board as set forth in claim 1, wherein the mineral fiber of the outer layer portions is at least one mineral fiber selected from the group consisting of rock wool, slag wool, mineral wool and glass wool.

7. An inorganic constructional board as set forth in claim 1, wherein the fibrous material of the middle layer portion is at least one mineral fiber selected from the group consisting of rock wool, slag wool, mineral wool and glass fiber.

8. An inorganic constructional board as set forth in claim 1, wherein the inorganic powder material is at least one powder selected from the group consisting of calcium carbonate, silica sand, microsilica, slag and aluminum hydroxide.

9. An inorganic constructional board as set forth in claim 1, wherein the organic binder of the middle and outer layer portions is at least one material selected from the group consisting of polyvinyl alcohol resin, phenolic resin and starch.

10. An inorganic constructional board as set forth in claim 1, wherein the inorganic powder material is at least one powder selected from the group consisting of calcium carbonate, silica sand, microsilica, slag and aluminum hydroxide.

11. An inorganic constructional board as set forth in claim 1, wherein the inorganic powder material has an average particle size of 40 µ to 300 µ.

12. An inorganic constructional board as set forth in claim 1, wherein the total amount of the organic component material of the middle and outer layer portions is less than 15%.

13. An inorganic constructional board as set forth in claim 1, wherein the total amount of the organic component material of the middle and outer layer portions is less than 7%.

14. A method of manufacturing an inorganic construction board having three layer portions comprising the steps of:

forming continuously two wet inorganic mats for first and second outer layer portions of the board from a slurry which comprises a mixture of a fibrous material of 20–60 wt % comprising mineral fiber, an inorganic powder material of 40–70 wt %, and an organic binder present in an amount sufficient to integrally bind the fibrous material and inorganic powder material;

spreading and depositing a mixture in a dry condition for forming a middle layer portion of the board on a surface of one of the outer layer portions to a uniform thickness, the mixture comprising an inorganic foamed material of 50–95 wt %, a fibrous material of 1–30 wt % comprising mineral fiber, and an organic binder present in an amount sufficient to integrally bind the inorganic foamed substance and fibrous material;

stacking the other outer layer portion on the middle layer portion;

pressing the stacked structure obtained in the previous step to form an integral laminate; and heating to dry the integral laminate, wherein the outer layer portions are interlocked with the middle layer portion.

15. A method of manufacturing an inorganic constructional board as set forth in claim 14, wherein the step of pressing comprises pressing the stacked structure obtained in the previous step to form the integral laminate by employing a hot press.

16. A method of manufacturing an inorganic constructional board as set forth in claim 14, wherein the wet inorganic mat is formed by employing a Fourdrinier-type former.

17. A method of manufacturing an inorganic constructional board as set forth in claim 14, wherein a cylinder-type former is employed in the step of forming the wet inorganic mat.

* * * * *

UNITED STATES PATENT AND TRADEMARK OFFICE
CERTIFICATE OF CORRECTION

PATENT NO. : 5,648,154
DATED : July 15, 1997
INVENTOR(S) : Akio KOH et al.

It is certified that error appears in the above-indentified patent and that said Letters Patent is hereby corrected as shown below:

Please cancel claim 8 and rewrite as follows:

--8. An inorganic constructional board as set forth in claim 1, wherein the fibrous material of the outer and middle layer portions comprises mineral fiber and at least any one of synthetic fiber or natural fiber.--

Signed and Sealed this

Thirtieth Day of May, 2000

Attest:

Q. TODD DICKINSON

*Attesting Officer*     *Director of Patents and Trademarks*